(12) United States Patent
Kim

(10) Patent No.: US 9,692,846 B2
(45) Date of Patent: Jun. 27, 2017

(54) SYSTEM, DEVICE AND METHOD FOR PROVIDING PUSH SERVICE USING FEEDBACK MESSAGE

(71) Applicant: SK TELECOM CO., LTD., Seoul (KR)

(72) Inventor: Jin Goog Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 428 days.

(21) Appl. No.: 14/051,767

(22) Filed: Oct. 11, 2013

(65) Prior Publication Data

US 2014/0047065 A1 Feb. 13, 2014
US 2016/0323403 A9 Nov. 3, 2016

Related U.S. Application Data

(63) Continuation of application No. PCT/KR2012/003796, filed on May 15, 2012.

(30) Foreign Application Priority Data

May 16, 2011 (KR) ........................ 10-2011-0045893

(51) Int. Cl.
G06F 15/16 (2006.01)
H04L 29/08 (2006.01)
H04L 12/58 (2006.01)

(52) U.S. Cl.
CPC .............. *H04L 67/26* (2013.01); *H04L 51/04* (2013.01); *H04L 51/30* (2013.01)

(58) Field of Classification Search
None
See application file for complete search history.

(56) References Cited

U.S. PATENT DOCUMENTS

2007/0088822 A1* 4/2007 Coile .................. H01R 31/005
709/224
2008/0140789 A1 6/2008 Mulligan et al.
2010/0049785 A1* 2/2010 Stoyanov .............. H04L 1/1607
709/203
2010/0173658 A1 7/2010 Fan et al.
(Continued)

FOREIGN PATENT DOCUMENTS

JP 2005050050 A 2/2005
KR 1020090053076 A 12/2010

OTHER PUBLICATIONS

Korean Notice of Allowance for application No. 10-2011-0045893 dated Feb. 4, 2013.

*Primary Examiner* — Padma Mundur
(74) *Attorney, Agent, or Firm* — Hauptman Ham, LLP

(57) ABSTRACT

Disclosed are a system for providing a push service using a feedback message including: a service providing device to transmit a push message to a client device and receive a feedback message with respect to the transmitted push message; and a push service device to receive the push message from the service providing device and transmit the push message to the client device, store the feedback message when the push message transmitted to the client device fails and a connection with the service providing device is disconnected, and transmit the stored feedback message to the service providing device.

14 Claims, 5 Drawing Sheets

(56) References Cited

U.S. PATENT DOCUMENTS

2010/0216434 A1* 8/2010 Marcellino ......... H04W 36/385
                                                           455/412.2
2011/0238734 A1* 9/2011 Curry ................. H04L 12/5895
                                                           709/203

* cited by examiner

SYSTEM, DEVICE AND METHOD FOR PROVIDING PUSH SERVICE USING FEEDBACK MESSAGE

CROSS-REFERENCE TO RELATED APPLICATION

The present application is a continuation of International Application No. PCT/KR2012/003796 filed on May 15, 2012, which is based on, and claims priority from, KR Application Serial Number 10-2011-0045893, filed on May 16, 2011. The disclosures of the above-listed applications are hereby incorporated by reference herein in their entirety.

FIELD

The present disclosure relates to a system, a device and a method for providing a push service using a feedback message.

BACKGROUND

The statements in this section merely provide background information related to the present disclosure and do not constitute prior art.

As smart phones have been distributed and various applications have appeared due to a smart phone environment, the use of radio resources has significantly increased. Particularly, always-on applications which are always accessed to receive a real time push message (or push notification) from a network, such as an Instant Message (IM) service, a web service, and a widget service currently increase at a high speed. The inventor(s) has experienced that the always-on applications are always ready to receive the push service while maintaining a connection with a service provider, so that excessive traffic is generated and battery consumption is made more rapid.

The inventor(s) has noted that when a service provider maintains a connection with a push server through a daemon configured within a client device without a direct connection between the service provider and the client device and transmits a push message or a push notification, the push server in the center receives the push message or push notification and transmits the push message or push notification to the corresponding client device.

FIG. 1 is a diagram of a configuration of a known push service providing system.

Referring to FIG. 1, since gateways 20 and carriers 30 are located between a plurality of service providers 10 and a plurality of terminals (or client devices) 40, the applications installed within the plurality of terminals 40 are connected with the carriers 30 and the gateways 20 and thus connected with the service providers 10 without the need to individually connect to the service provider 10.

The gateways 20 are relay devices for performing connections with the plurality of service providers 10, and the carriers 30 are devices for performing connections with the plurality of terminals 40. The gateways 20 and the carriers 30 have an expandable structure according to increases in the service providers 10 and the terminals 40.

However, the inventor(s) has noted that in the known structure according to FIG. 1, the service provider 10 transmits a push message to the terminal 40. Further, the inventor(s) has noted that the service provider 10 cannot identify whether the transmitted message is properly notified to the terminal 40.

When the push message is not received since a connection with the terminal 40 is temporarily disconnected, the service provider 10 retransmits the push message. However, even when the push message is not notified since an application is removed from the terminal 40 or an error is generated, the service provider 10 transmits the push message to the terminal 40. The inventor(s) has noted that unnecessary push messages are transmitted from the service provider 10 and thus total amounts of the push messages increase. Further, the inventor(s) has experienced that the unnecessary push messages increase loads of the network.

The inventor(s) has, therefore, noted that a method of providing a push service while reducing the unnecessary push messages by identifying whether the notification of the push message transmitted from the service provider is properly made is required.

SUMMARY

In accordance with an aspect of the present disclosure, a system for providing a push service using a feedback message comprises a service providing device and a push service device. The service providing device is configured to transmit a push message to a client device and receive a feedback message with respect to the transmitted push message. And the push service device is configured to receive the push message from the service providing device and transmit the push message to the client device, store the feedback message when (i) the push message transmitted to the client device fails and (ii) a connection of the push service device with the service providing device is disconnected, and transmit the stored feedback message to the service providing device.

In accordance with another aspect of the present disclosure, a push service device for providing a push service using a feedback message, comprises a service provider (SP) interworking unit, a client interworking unit and a controller. The service provider (SP) interworking unit is configured to receive a push message transmitted from a service providing device. The client interworking unit is configured to transmit the received push message to a client device and receive a push response message from the client device. And the controller is configured to store a feedback message with respect to the push message when (i) it is identified, through the received push response message, that the push message transmitted to the client device fails and (ii) a connection of the push service device with the service providing device is disconnected, and transmit the stored feedback message to the service providing device through the SP interworking unit.

In accordance with another aspect of the present disclosure, a push service device is configured to: receive a push message from a service providing device; transmit the received push message to a client device and receiving a push response message from the client device; store a feedback message with respect to the push message when (i) it is identified, through the received push response message, that the push message transmitted to the client device fails and (ii) a connection of the push service device with the service providing device is disconnected; and transmit the stored feedback message to the service providing device.

DETAILED DESCRIPTION

Figure 1:
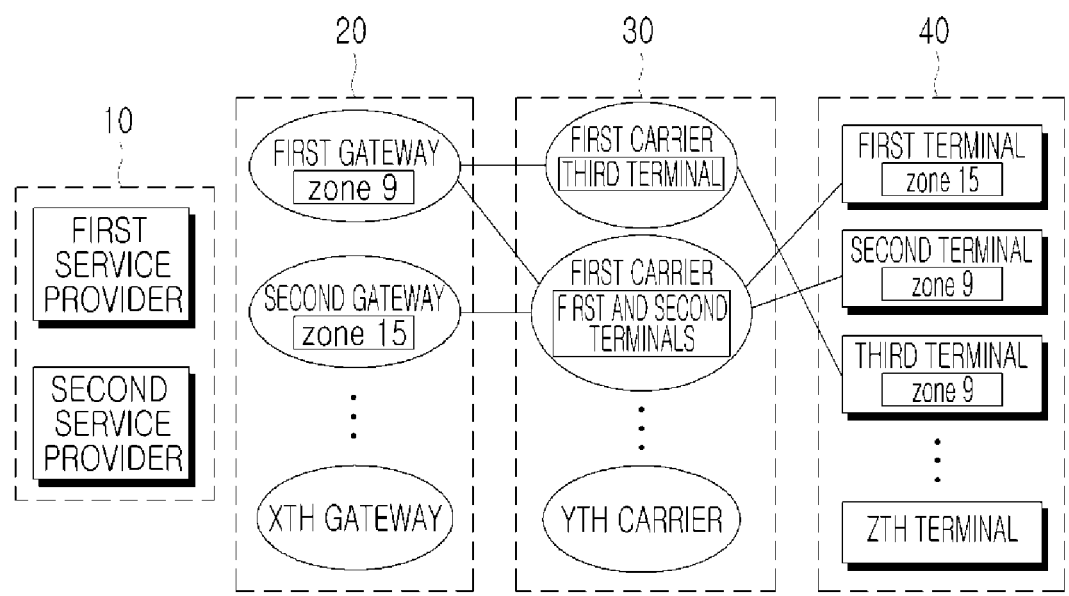
FIG. 1 is a diagram of a configuration of a known push service providing system.

Hereinafter, an exemplary embodiment of the present disclosure will be described with reference to the accompanying drawings. A configuration of the present disclosure and an action effect according to the configuration will be clearly understood through the following detailed description. Prior to the detailed description, the same elements will be designated by the same reference numerals although they are shown in different drawings, and a detailed description of known functions and configurations incorporated herein will be omitted when it makes the subject matter of the present disclosure rather unclear.

Figure 2:
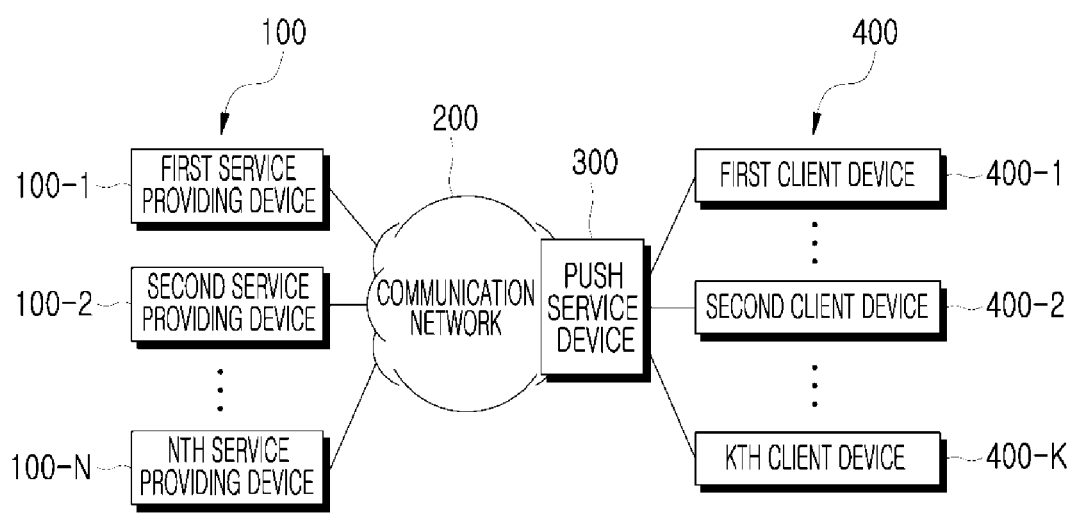
FIG. 2 is a diagram of a network configuration of a push service providing system using a feedback message according to at least one embodiment of the present disclosure.

FIG. 2 is a diagram of a network configuration of a push service providing system using a feedback message according to at least one embodiment of the present disclosure.

As shown in FIG. 2, a push service providing system according to at least one embodiment of the present disclosure includes a plurality of service providing devices 100 (100-1 to 100-N), a push service device 300, and a plurality of client devices 400 (400-1 to 400-K). The push service providing system has a structure in which connections between the plurality of service providing devices 100 and the plurality of client devices 400 are made through the push service device 300 in the center.

The plurality of client devices 400 are terminals which can access a communication network 200 and includes, for example, a Personal Computer (PC), a notebook, a smart phone, a Personal Digital Assistant (PDA), navigation, a Portable Multimedia Player (PMP), an electronic dictionary, an MP3 and the like. The plurality of client devices 400 are loaded with client application programs configured to transmit and receive data (especially, push messages) through connections with the communication network 200.

Basically, the push service device 300 gathers push messages transmitted from the plurality of service providing devices 100 and transmits the gathered push messages to the corresponding client device 400. The push service device 300 manages interconnections between the service providing devices 100 and the client devices 400.

At this time, the push service device 300 is configured to receive a push message from the service providing device 100 and transmit the push message to the client device 400. When notification of the push message to the client device 400 fails and a connection with the service providing device 100 is disconnected, the push service device 300 stores a feedback message with respect to the notification of the push message. Thereafter, the push service device 300 is reconnected with the service providing device 100 or transmits the stored feedback message to the service providing device 100 according to a request for the feedback message of the service providing device 100.

When an application is removed from the client device 400 and thus the notification of the push message fails, the push service device 300 receives a push response message including application deletion or uninstallation information from the client device 400. The push service device 300 informs that the application is deleted from or not installed in the client device 400 by transmitting a feedback message to the service providing device 100 through a session which the push message was received through. The feedback message includes a token including at least one selected from the group consisting of a client ID of the client device 400 and an application ID of the deleted application.

The plurality of service providing devices 100 refer to servers or terminals that transmit a push message to the plurality of client devices 400 to provide a push service. The plurality of service providing devices 100 transmit the push message and receive the feedback message from the push service device 300 as a result of the push message. Through the feedback message, the plurality of service providing devices 100 can identify whether a notification of the push message is successful or fails.

When the notification of the push message is successful, the plurality of service providing devices 100 continuously transmit the push message to the plurality of client devices 400. In contrast, when the notification of the push message fails, the plurality of service providing devices 100 determine that the plurality of client device 400 cannot perform the push message and do not transmit the push message to be transmitted to the plurality of client device 400. Accordingly, amounts of unnecessary push messages transmitted to the plurality of client devices 400 from the service providing devices 100 are reduced.

Figure 3:
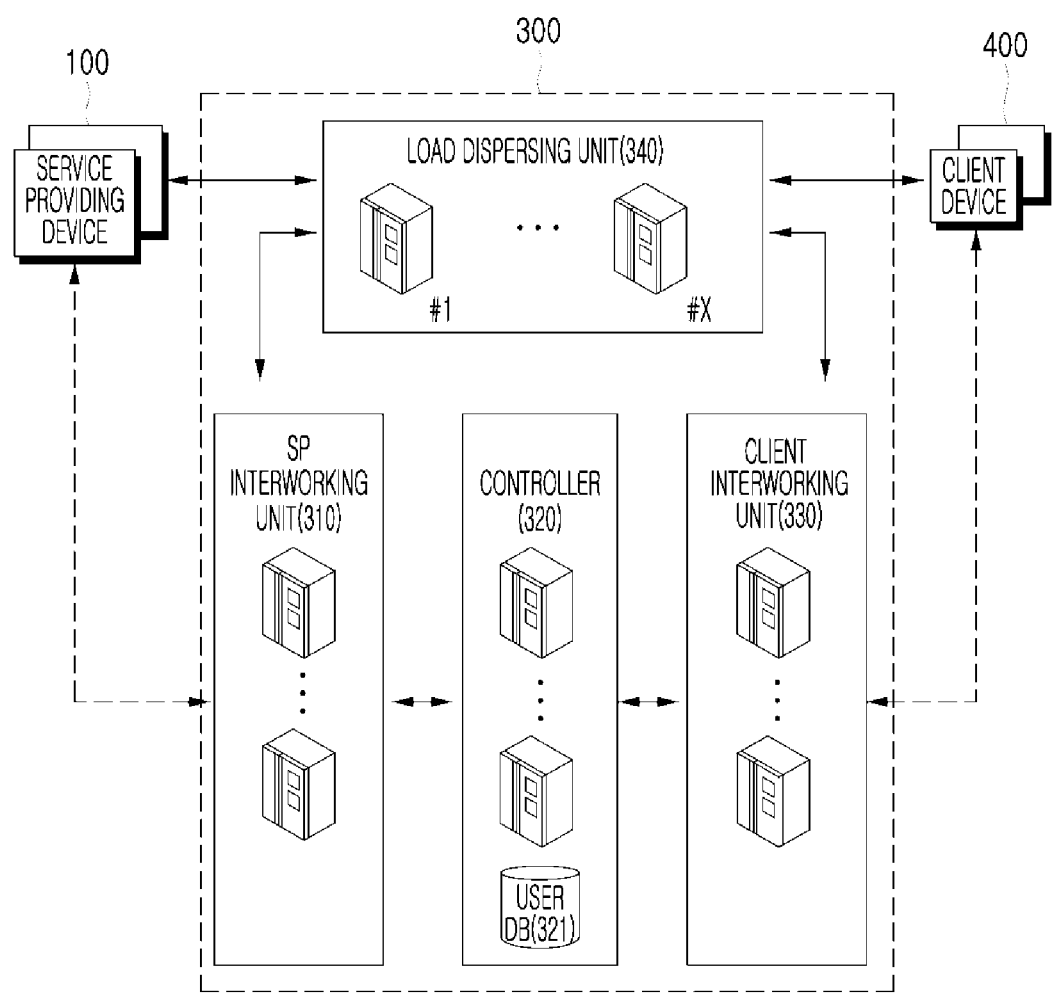
FIG. 3 is a diagram of a configuration of a push service device according to at least one embodiment of the present disclosure.

FIG. 3 is a diagram illustrating a configuration of the push service device of FIG. 2 according to at least one embodiment of the present disclosure.

The push service device 300 according to at least one embodiment of the present disclosure includes an SP interworking unit 310, a controller 320, a client interworking unit 330, and a load dispersing unit 340. Here, the push service device 300 further includes a user DB 321 configured to store a feedback message. Other components of the push service device 300, such as the SP interworking unit 310, the controller 320, the client interworking unit 330, and the load dispersing unit 340 are implemented by one or more processors and/or application-specific integrated circuits (ASICs). All the components in FIG. 3 are plural ones. It is assumed for description convenience that a component (e.g., SP interworking unit 310) described as a single indicates each of the corresponding plurality of components (e.g., SP interworking units 310). This assumption applies to other components in FIG. 3 for description convenience.

The SP interworking unit 310 is configured to be connected with the plurality of service providing devices 100 to receive a push message from the plurality of service providing devices 100. Here, the received push message includes a new push message, an updated push message, an event push message or the like. The number of SP interworking units 310 is plural according to the number of connected service providing devices 100.

The load dispersing unit 340 is configured to designate an interworking unit connectable with the service providing devices 100 when there are connection requests from the plurality of service providing devices 100. Accordingly, the loading dispersing unit 340 performs a function of dispersing loads of each of the SP interworking units 310 (i.e., multiple SP interworking units 310).

Meanwhile, when a reconnection request message is received from the service providing device 100 after a session with the service providing device 100 is disconnected, the load dispersing unit 340 designates the previously designated SP interworking unit again or alternatively designates another of the SP interworking units 310.

The client interworking unit 330 is configured to be connected with the plurality of client devices 400 to push a push message received from the controller 320 to the corresponding client device 400. Further, the client interworking unit 330 receives a push response message in response to the push message. Here, the push response message includes whether notification of the push message is properly made in the corresponding client device 400. Further, the push response message includes application deletion information or application uninstallation information of the client device 400.

Meanwhile, the controller 320 is configured to manage the SP interworking unit 310 and the client interworking unit 330 built in the push service device 300. When the controller 320 receives the push message from the SP interworking unit 310, the controller 320 designates (or selects) the client interworking unit 330 with which the corresponding client device 400 can be connected through client information included in the push message. Further, the controller 320 transmits the received push message to the client interworking unit 330.

The controller 320 identifies that notification of the push message fails through the push response message received by the client interworking unit 330. The controller 320 generates a feedback message with respect to the notification of the push message and transmits the feedback message to the SP interworking unit 310. The controller 320 receives a feedback response result from the SP interworking unit 310 and identifies that the connection with the service providing device 100 is disconnected. In this case, the feedback message is stored in the user DB 321.

In at least one embodiment (hereinafter, referred to as "first embodiment" for description convenience), when the controller 320 receives notification of a reconnection with the service providing device 100 through the SP interworking unit 310, the controller 320 transmits the feedback message stored in the user DB 321 to the SP interworking unit 310 and allows the feedback message to be transmitted to the service providing device 100.

In another embodiment (hereinafter, referred to as "second embodiment" for description convenience), when the controller 320 receives a request for the feedback message from the service providing device 100 through the SP interworking unit 310, the controller 320 transmits the feedback message stored in the user DB 321 to the SP interworking unit 310 and allows the feedback message to be transmitted to the service providing device 100.

A push message providing method performed by the push service device will be described, with reference to FIGS. 4 and 5, through two embodiments including the first embodiment of transmitting the feedback message according to the request for the feedback message and the second embodiment of transmitting the feedback message when the reconnection with the service providing device 100 is made.

Figure 4:
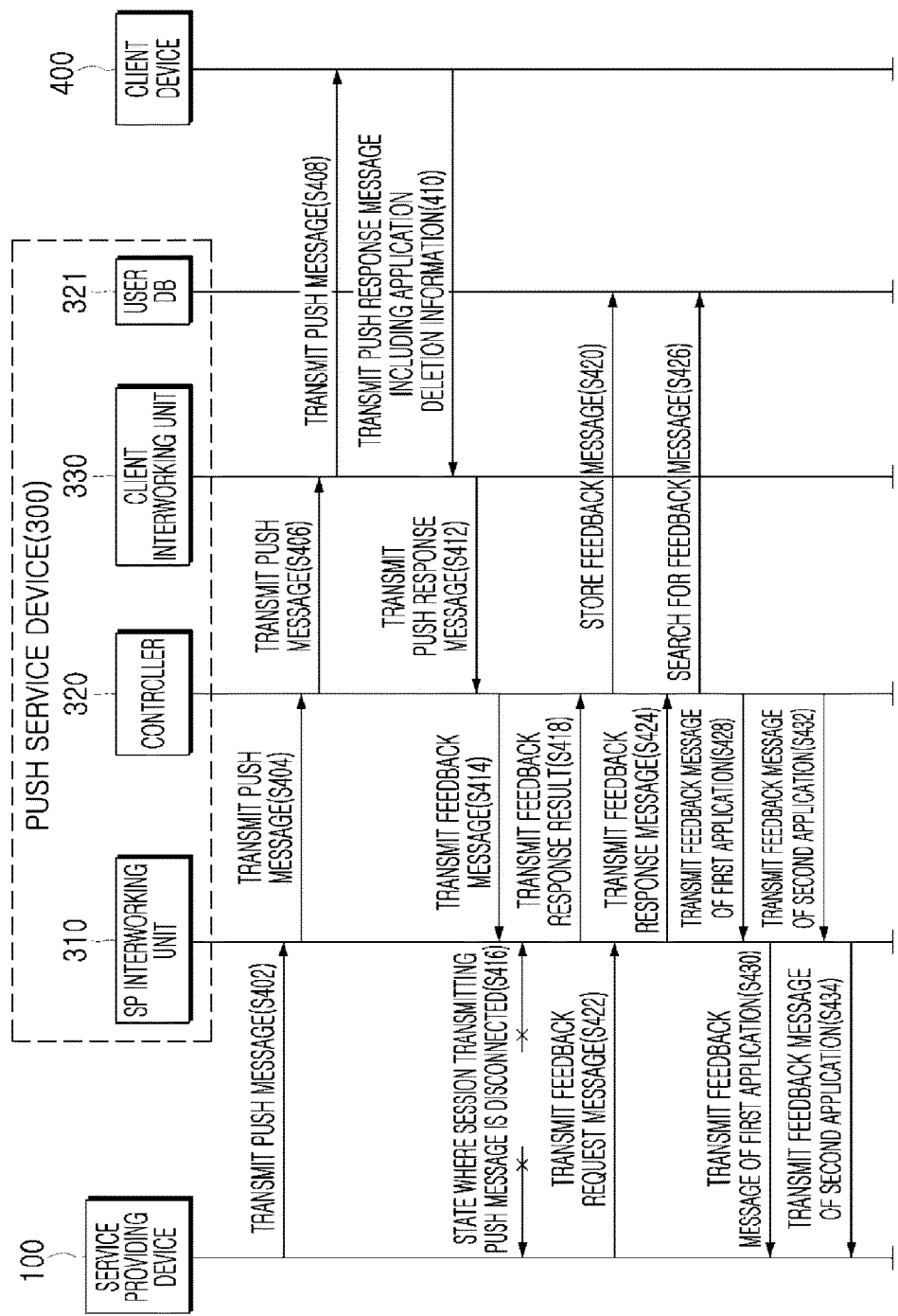
FIG. 4 is a flowchart of a push service providing method based on transmission of a feedback message when a feedback is requested according to at least one embodiment of the present disclosure.

FIG. 4 is a flowchart of a push service providing method based on transmission of the feedback message when a feedback is requested. FIG. 4 is related to the first embodiment of the present disclosure.

When the push service device 300 receives connection requests from the plurality of service providing devices 100, the load dispersing unit 340 of the push service device 300 designates an interworking unit which is connected with each of the service providing devices 100 and the service providing device 100 is connected to the designated SP interworking unit 310 through the load dispersing unit 340 to connect a session.

Thereafter, the SP interworking unit 310 receives a push message through the session connected with the service providing device 100 in step S402.

The SP interworking unit 310 decodes the received push message and transmits the decoded push message to the controller 320 in step S404. At this time, the number of the controllers 320 is plural according to the number of the SP interworking units 310. In this case, since a correspondence relation between the SP interworking units 310 and the controllers 320 is preset, each of the SP interworking units 310 transmit the push message to each preset controllers 320.

Further, each of the controllers 320 identifies each corresponding client interworking unit 330 with which the corresponding client device can be connected based on client information included in the push message transmitted from each corresponding SP interworking unit 310 and transmits the push message to the identified corresponding client interworking unit 330 in step S406. For the identification, the controller 320 refers to routing information on the corresponding client interworking units 330 connectable for each client device.

Subsequently, the client interworking unit 330 transmits the push message to each of the client devices 400 which are matched with each of the client interworking units 330 in step S408.

Thereafter, the corresponding client interworking unit 330 receives a push response message including the application deletion information from the client device 400 in step S410. Here, the push response message includes whether the notification (or transmission) of the push message is successful or fails. When the application is deleted from or not installed in the client device 400, the push response message includes the application deletion information or the application uninstallation information.

Further, the client interworking unit 330 transmits the push response message to the controller 320 in step S412.

Subsequently, the controller 320 generates a feedback message informing that the notification of the push message fails through the push response message and transmits the feedback message to the SP interworking unit 310 in step S414. The transmission of the feedback message is to inform the service providing device 100 of a result of the push message.

The SP interworking unit 310 identifies a disconnection state of the session in which the push message is transmitted in step S416.

Subsequently, the SP interworking unit 310 inserts, the fact (or information) that the session in which the push message is transmitted is disconnected with the service providing device 100, into a feedback response result and then transmits the feedback response result to the controller 320 in step S418.

The controller 320 stores the feedback message in the user DB 321 in step S420.

Thereafter, the SP interworking unit 310 receives a feedback request message from the service providing device 100 in step S422.

The SP interworking unit 310 transmits the feedback request message received from the service providing device 100 to the controller 320 in step S424.

The controller 320 receives the feedback request message, searches for the feedback message in the user DB 321, and loads (or retrieves) the corresponding feedback message in step S426.

Here, when the controller 320 receives a push response message including multiple pieces of deletion information for each application from the client interworking unit 330, the controller 320 divides a plurality of feedback messages corresponding to the multiple pieces of deletion information for each application and then transmits the divided feedback messages to the service providing device 100.

For example, when the push response message includes first application deletion information and second application deletion information, the controller 320 transmits the feedback message of the first application among the searched feedback messages to the SP interworking unit 310 in step S428. Further, the SP interworking unit 310 transmits the feedback message of the first application to the service providing device 100 in step S430.

The controller 320 transmits the feedback message of the second application among the searched feedback messages to the SP interworking unit 310 in step S432. The SP interworking unit 310 transmits the feedback message of the second application to the service providing device 100 in step S434.

Meanwhile, the second embodiment of transmitting the feedback message when the push service device 300 is reconnected with the service providing device 100 will be described with reference to FIG. 5.

Figure 5:
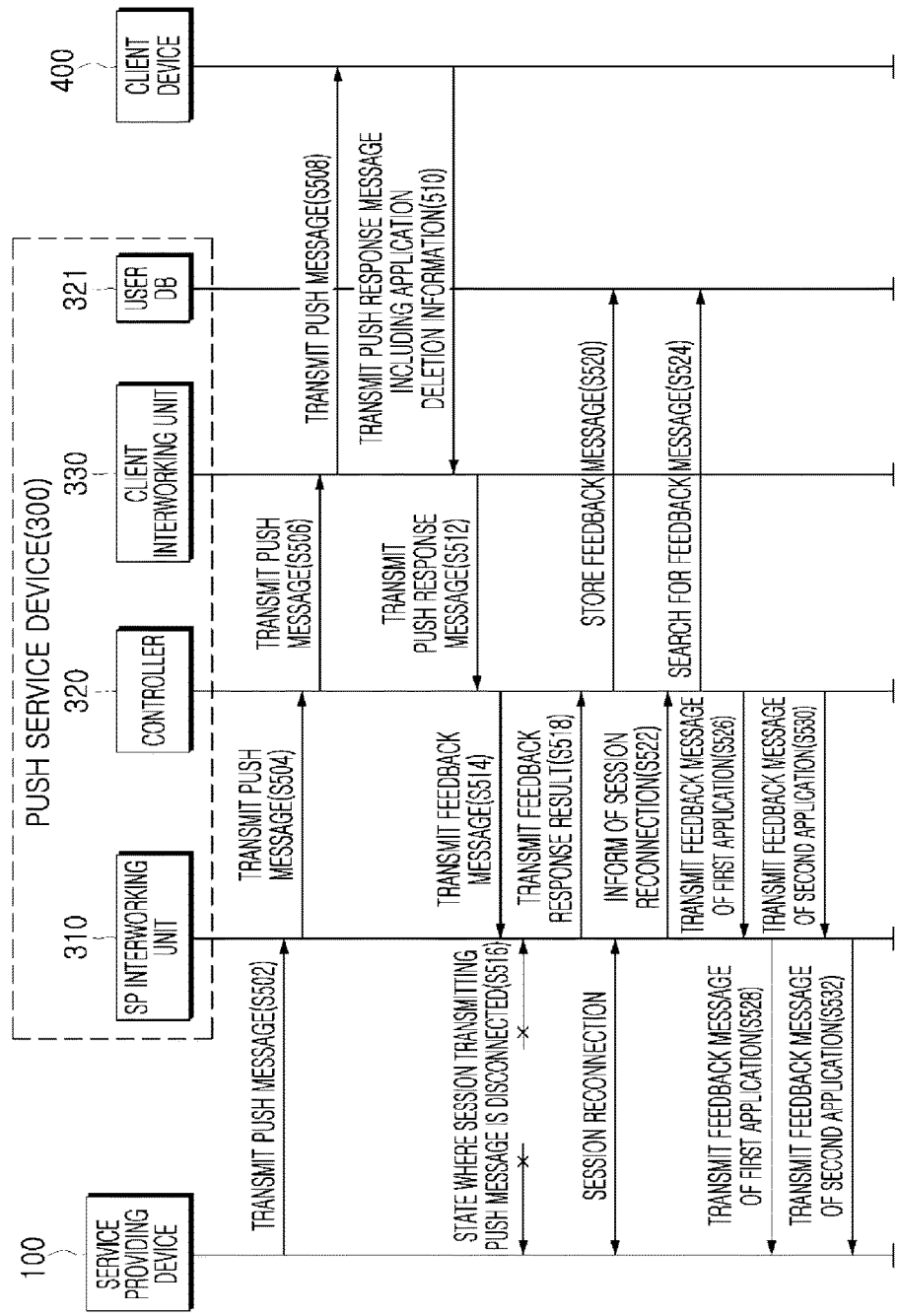
FIG. 5 is a flowchart of a push service providing method based on real time transmission of a feedback message according to at least another embodiment of the present disclosure.

FIG. 5 is a flowchart of a push service providing method based on transmission of the feedback message FIG. 5 is related to the second embodiment of the present disclosure.

When the push service device 300 receives connection requests from the plurality of service providing devices 100, the load dispersing unit 340 of the push service device 300 designates an interworking unit with which each of the service providing device 100 can be connected and the service providing device 100 is connected with the designated SP interworking unit 310 through the load dispersing unit 340 to connect a session.

Thereafter, the SP interworking unit 310 receives a push message through the session connected with the service providing device 100 in step S502.

The SP interworking unit 310 decodes the received push message and transmits the decoded push message to the controller 320 in step S504. At this time, the number of controllers 320 is configured to be as many as the number of the SP interworking units 310. In this case, since a correspondence relation between the SP interworking units 310 and the controllers 320 is preset, each of the SP interworking units 310 transmit the push message to the preset controller 320.

Further, the controller 320 identifies the client interworking unit 330 with which the corresponding client device can be connected based on client information included in the push message transmitted from the SP interworking unit 310 and transmits the push message to the identified client interworking unit 330 in step S506. For the identification, the controller 320 refers to routing information on the client interworking units 330 connectable for each client device.

Subsequently, the client interworking unit 330 transmits the push message to each of the client devices 400 which are matched with each of the client interworking units 330 in step S508.

Thereafter, the client interworking unit 330 receives a push response message including application deletion information from the client device 400 in step S510. Here, the push response message includes whether the notification of the push message is successful or fails. When the application is deleted from or not installed in the client device 400, the push response message includes the application deletion information or the application uninstallation information.

Further, the client interworking unit 330 transmits the push response message to the controller 320 in step S512.

Subsequently, the controller 320 generates a feedback message informing that the notification of the push message fails through the push response message and transmits the feedback message to the SP interworking unit 310 in step S514. The transmission is to inform the service providing device 100 of a result of the push message through the feedback message.

The SP interworking unit 310 identifies a disconnection state of the session in which the push message is transmitted in step S516.

Subsequently, the SP interworking unit 310 inserts, the fact (information) that the session in which the push message is transmitted is disconnected with the service providing device 100, into a feedback response result and then transmits the feedback response result to the controller 320 in step S518.

The controller 320 stores the feedback message in the user DB 321 in step S520.

The SP interworking unit 310 periodically checks a state of the connection with the service providing device 100 to identify whether a reconnection with the service providing device is made. Through the check, when the SP interworking unit 310 identifies that the session with the service providing device 100 is reconnected, the SP interworking unit 310 informs the controller 320 of the reconnection of the session in step S522.

When the controller 320 identifies the reconnection of the session from the SP interworking unit 310, the controller 320 searches for the feedback message in the user DB 321 and loads (retrieves) the corresponding feedback message in step S524.

Here, when the controller 320 receives the push response message including multiple pieces of deletion information for each application from the client interworking unit 330, the controller 320 divides a plurality of feedback messages corresponding to the multiple pieces of deletion information for each application and then transmits the divided feedback messages to the service providing device 100.

For example, when the push response message includes first application deletion information and second application deletion information, the controller 320 transmits the feedback message of the first application among the searched feedback messages to the SP interworking unit 310 in step S526. Further, the SP interworking unit 310 transmits the feedback message of the first application to the service providing device 100 in step S528.

The controller 320 transmits the feedback message of the second application among the searched feedback messages to the SP interworking unit 310 in step S530. The SP interworking unit 310 transmits the feedback message of the second application to the service providing device 100 in step S532.

As described above, according to at least one embodiment of the present disclosure, when the notification of the push message to the client device through the push service device providing the push service fails (for example, due to an application deletion in the client device) and the connection with the service providing device is disconnected, the push service device stores the feedback message. Further, when the feedback request is received from the service providing device or the reconnection with the service providing device is made, the push service device transmits the stored feedback message to the service providing device, so that the service providing device does not transmit the push message to the client device by identifying the feedback message, thereby reducing amounts of the messages to be transmitted.

In addition, according to at least one embodiment of the present disclosure, when the feedback request is received from the service providing device or the reconnection with the service providing device is made, the push service device transmits the stored feedback message to the service providing device, so that the feedback message is transmitted to the service providing device even when the connection with the service providing device is disconnected.

According to the present disclosure, when notification of a push message to a client device through a push service device providing a push service fails (for example, application deletion) and a connection with a service providing device is disconnected, a feedback message is stored and the stored feedback message is transmitted to the service providing device when there is a feedback request from the service providing device or when a reconnection with the service providing device is made, so that the service providing device identifies not to transmit a push message to a deleted application of the client device, thereby reducing amounts of the messages and reducing loads of the network. The present disclosure, for example, improves a push service capability by effectively identifying a feedback of a push service provided by a service providing device regardless of a connection state and reduce network loads by reducing amounts of unnecessary push messages transmitted to a client device from the service providing device when the service providing device provides the push service to the client device through the push service device.

Some embodiments as described above are implemented in the form of one or more program commands that can be read and executed by a variety of computer systems and be recorded in any non-transitory, computer-readable recording medium. The computer-readable recording medium includes a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device is configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

The above description merely corresponds to an example and is variously modified without departing from the scope of the claimed invention by those skilled in the art. Accordingly, the embodiments disclosed in the specification of the present disclosure do not limit the present disclosure. The scope of the claimed invention is construed by the appended claims and all technologies within the range equivalent to the claims are construed as being included in the scope of the claimed invention. Specific terms used in this disclosure and drawings are used for illustrative purposes and not to be considered as limitations of the present disclosure.

The invention claimed is:

1. A system for providing a push service using a feedback message, the system comprising:
    a service providing device comprising one or more processors or application specific integrated circuits (ASICs) configured to transmit a push message to a client device and receive the feedback message with respect to the push message; and
    a push service device comprising one or more processors or application specific integrated circuits (ASICs) configured to
        receive the push message from the service providing device and transmit the push message to the client device,
        receive from the client device a push response message with respect to the push message,
        identify whether a transmission of the push message to the client device failed or not through the push response message, and/or whether a connection of the push service device with the service providing device is disconnected,
        generate the feedback message with respect to the failure of the push message and/or the connection identified to be disconnected, wherein the feedback message includes information indicating that transmitting the push message to the client device has failed, and based on the feedback message the service providing device stops sending the push message to the client device via the push service device to reduce network load,
        store the generated feedback message when the push message transmitted to the client device is identified to be failed, and/or when the connection of the push service device with the service providing device is identified to be disconnected, and
        transmit the stored feedback message to the service providing device when the push service device identifies a reconnection with the service providing device, or when the push service device receives a request for the feedback message from the service providing device.

2. A push service device for providing a push service using a feedback message, the push service device comprising:
    a service provider (SP) interworking unit comprising one or more processors or application specific integrated circuits (ASICs) configured to receive a push message transmitted from a service providing device;
    a client interworking unit comprising one or more processors or application specific integrated circuits (ASICs) configured to transmit the received push message to a client device and receive a push response message from the client device; and
    a controller comprising one or more processors or application specific integrated circuits (ASICs) configured to
        receive a push response message with respect to the push message from the client device through the client interworking unit, identify whether a transmission of the push message to the client device failed or not through the push response message, and/or whether a connection of the push service device with the service providing device is disconnected, generate the feedback message with respect to the failure of the push message and/or the connection identified to be disconnected, wherein the feedback message includes information indicating that transmitting the push message to the client device has failed, and based on the feedback message the service providing device stops sending the push message to the client device via the push service device to reduce network load, store the generated feedback message when through the push response message, the push message transmitted to the client device is identified to be failed, and/or when the connection of the push service device with the service providing device is identified to be disconnected, and transmit the stored feedback message to the service providing device through the SP interworking unit when the controller identifies a reconnection with the service providing device, or when the controller receives a request for the feedback message from the service providing device.

3. The push service device of claim 2, wherein the controller is configured to transmit the stored feedback message to the service providing device through the SP interworking unit in response to a request for the feedback message of the service providing device.

4. The push service device of claim 2, further comprising:
a user data base (DB) configured to store the feedback message.

5. The push service device of claim 2, wherein the client interworking unit is configured to receive the push response message including application deletion information from the client device when an application is deleted from the client device.

6. The push service device of claim 5, wherein, when the push response message including multiple pieces of deletion information for each application is received through the client interworking unit, the controller is configured to divide a plurality of feedback messages corresponding to the multiple pieces of deletion information for each application and transmit the divided feedback messages to the service providing device.

7. The push service device of claim 5, wherein the feedback message includes a token including a client identifier (ID) of the client device and an application identifier (ID) of the deleted application.

8. The push service device of claim 2, further comprising:
a load dispersing unit comprising one or more processors or application specific integrated circuits (ASICs) configured to designate each of multiple SP interworking units when there are connection requests from the service providing device.

9. The push service device of claim 8, when a reconnection request message is received from the service providing device after a session with the service providing device is disconnected, the load dispersing unit designates a previously designated SP interworking unit again or alternatively designates another of the multiple SP interworking units.

10. A method of providing a push service using a feedback message, the method performed by a push service device and comprising:
receiving a push message from a service providing device to be transmitted to a client device;
checking whether the client device is able to be connected through client information included in the push message;
transmitting the received push message to the client device and receiving a push response message from the client device;
receiving the push response message with respect to the push message from the client device through the client interworking unit;
identifying whether a transmission of the push message to the client device failed or not through the push response message, and/or whether a connection of the push service device with the service providing device is disconnected;
generating the feedback message with respect to the failure of the push message and/or the connection identified to be disconnected, wherein the feedback message includes information indicating that transmitting the push message to the client device has failed, and based on the feedback message the service providing device stops sending the push message to the client device via the push service device to reduce network load;
storing the generated feedback message when through the push response message, the push message transmitted to the client device is identified to be failed, and/or when the connection of the push service device with the service providing device is identified to be disconnected; and
transmitting the stored feedback message to the service providing device when a reconnection with the service providing device is made, or when a request for the feedback message is received from the service providing device.

11. The method of claim 10, wherein the transmitting of the stored feedback message comprises periodically checking a state of the connection of the push service device with the service providing device to identify whether the reconnection of the push service device with the service providing device is made.

12. The method of claim 10, wherein the push response message comprises application deletion information when an application is deleted from the client device.

13. The method of claim 12, wherein, when the push response message includes multiple pieces of deletion information for each application, the transmitting of the stored feedback message comprises
dividing a plurality of feedback messages corresponding to the multiple pieces of deletion information for each application and
transmitting the divided feedback messages to the service providing device.

14. The method of claim 12, wherein the feedback message includes a token including a client identifier (ID) of the client and an application identifier (ID) of the deleted application.

* * * * *